（12）United States Patent
Thompson et al.

(10) Patent No.: US 7,025,888 B2
(45) Date of Patent: Apr. 11, 2006

(54) FLOATING DECANTER (75) Inventors: James E. Thompson, The Woodlands, TX (US); Jeffrey S. Devine, The Woodlands, TX (US); Michael Combs, Houston, TX (US)

(73) Assignee: Ashbrook Simon-Hartley Operations, LP, Houston, TX (US)

( * ) Notice: Subject to any disclaimer, the term of this patent is extended or adjusted under 35 U.S.C. 154(b) by 106 days.

(21) Appl. No.: 10/478,611

(22) PCT Filed: May 23, 2002

(86) PCT No.: PCT/US02/16773

§ 371 (c)(1),
(2), (4) Date: Nov. 24, 2003

(87) PCT Pub. No.: WO02/094411

PCT Pub. Date: Nov. 28, 2002

(65) Prior Publication Data

US 2004/0168967 A1 Sep. 2, 2004

Related U.S. Application Data (60) Provisional application No. 60/333,391, filed on Nov. 26, 2001, provisional application No. 60/293,031, filed on May 23, 2001.

(51) Int. Cl.
*B01D 21/24* (2006.01)

(52) U.S. Cl. ...................... 210/744; 210/745; 210/776; 210/104; 210/122; 210/242.1; 210/540

(58) Field of Classification Search ................ 210/744, 210/745, 776, 104, 122, 242.1, 242.3, 540
See application file for complete search history.

(56) References Cited

U.S. PATENT DOCUMENTS

| 1,450,545 | A | * | 4/1923 | Hans | 210/122 |
| 3,578,171 | A | * | 5/1971 | Usher | 210/776 |
| 4,154,678 | A | * | 5/1979 | Kole | 210/242.1 |
| 4,695,376 | A | * | 9/1987 | Astrom et al. | 210/242.1 |
| 4,728,440 | A | * | 3/1988 | van Kuijeren | 210/744 |
| 4,867,872 | A | * | 9/1989 | Russell et al. | 210/540 |
| 4,956,100 | A | * | 9/1990 | Mikkleson | 210/776 |
| 5,104,528 | A | * | 4/1992 | Christie | 210/242.1 |
| 5,108,591 | A | * | 4/1992 | Hagan | 210/122 |
| 5,118,412 | A | * | 6/1992 | Schmidt | 210/242.3 |
| 6,224,753 | B1 | * | 5/2001 | Marbach | 210/242.1 |
| 6,277,273 | B1 | * | 8/2001 | Gore et al. | 210/242.1 |

* cited by examiner

*Primary Examiner*—Christopher Upton
(74) *Attorney, Agent, or Firm*—Jeffrey L. Wendt (57) ABSTRACT A floating decanter and method for charging supernatant from a vesel without drawing floating solids or scum into the discharge. The decanter includes a weir (16) having a central opening, and a solid bottom side, a float (12) adjacent to an outer edge of the weir, a weir lift and drive (14) having at least two screw jacks (20) attached to the float and a attachment arm (26) extending to the weir, and an discharge pipe (32) attached to the bottom of the weir. The weir is lowered with respect to the float to discharge supernatant.

29 Claims, 8 Drawing Sheets

FLOATING DECANTER

This application is a 371 of PCT/US02/16773, filed May 23, 2002, which claims the benefits of U.S. Provisional Application 60/293,031, filed May 23, 2001; and U.S. Provisional Application 60/333,391, filed Nov. 26, 2001.

BACKGROUND OF THE INVENTION

1. Field of the Invention

The present invention relates to a method and apparatus for withdrawing supernatant from a reactor without drawing floating solids or scum during a decanting operation. The present apparatus and method are particularly useful in biological wastewater treatment operations, such as a sequencing batch reactor (SBR), an aerobic digester, or the like.

2. Brief Description of the Prior Art

A number of decanting systems have been developed to withdraw supernatant from a basin following the settling phase in an SBR. These devices can generally be classified as a fixed type decanter or a floating type decanter. The object of these devices is to withdraw the supernatant without withdrawing floating solids or scum during the decant sequence. Equally important is that the suspended solids are also prevented from entering the decanter receptacle during non-decant sequences.

An example of a floating-type decanter is disclosed in U.S. Pat. No. 4,695,376 to Astrom et al. This floating decanter attempts to prevent floating solids or scum from entering the stream of decanted supernatant via a weir-to-float interface. During non-decant sequences, the weir is held against the underside of the float (in a submerged position) in a sealed arrangement for preventing suspended solids from entering the weir. After the settling phase of the SBR, a linear actuator is utilized to lower the weir from the underside of the float, thereby enabling the weir to decant the supernatant.

Unfortunately, during the fill, react, and settling SBR phases, suspended solids enter and accumulate in the decanter receptacle due to the inability of the sealing arrangement to provide an absolute seal. Consequently, during the initial decanting operation, a higher solids content is evident in the decanted supernatant. In many instances, the solids content necessitates that the system be flushed. Typically, the system is flushed by recirculating the first several minutes of decant fluid. This operation flushes the lines of solids settled in the decanter during non-decant sequences, but does not ensure effluent suspended solids consistent with the quality of the clarified supernatant.

One proposed solution to these problems is described in U.S. Pat. No. 5,104,528 to Christie. The Christie patent discloses a floating decanter apparatus, which includes a weir for decanting supernatant and a float for buoyantly supporting the weir in the basin. The Christie patent discloses a single, centrally-located actuator to raise and lower the weir. This configuration allows the weir to tilt and may result in poorly-controlled discharge rates, as well as discharge containing suspended solids. The Christie patent further discloses a valve at the basin outlet end of the effluent pipe to retain water inside the weir when it is shut down. The valve is necessary because the weight of the decanter is insufficient to push the empty (buoyant) weir under the water. The floatation ring is lifted out of the water when the weir is empty. It is then necessary to refill the weir and effluent pipe with fresh water.

Another proposed decanting apparatus is disclosed in U.S. Pat. No. 5,358,644 to Dennis. The decanter disclosed in the Dennis patent includes a decanter receptacle, which has a top opening surrounded by a decanter rim, a decant pipe, and a float overlying the decanter receptacle in which the decanter rim is spaced below the float. In this apparatus, the seal between the top of the weir and the bottom of the float is not always sufficient to prevent suspended solids from entering the decant pipe, resulting in the discharge of water with suspended solids.

U.S. Pat. No. 5,421,995 to Norcross discloses a sludge level detector for floating decanters. The apparatus disclosed by Norcross includes a floating decanter assembly with a sludge detector light source and light sensor pair in a spaced-apart relation on a sludge layer detector frame, which is suspended below the floating decanter assembly. This apparatus provides some improvement over the prior art, however, its usefulness declines as the detector located at the bottom of the decanter assembly approaches the top of the sludge blanket.

Many floating decanter devices utilize decanting weirs or orifices that remain underwater throughout all sequences (even when not decanting), and they must incorporate various sealing arrangements in an attempt to prohibit mixed liquor suspended solids from entering the decanter. One such type of device uses a linear actuator to raise the weir during non-decant sequences and presses the weir lip against a gasket located on the bottom of the float. Since this seal will potentially leak, they must also close a motorized decant valve. A coil spring is required to provide the desired closing pressure force of 1,500 pounds. Another type of device utilizes spring loaded flapper valves for sealing the orifice openings and also close the motorized decant valve. Both of these devices have the decant entry (weir lip or an orifice opening) in the submerged position during non-decant sequences. In the event that the decant valve should leak, fail, or the sealing mechanism wear out, untreated wastewater would be discharged into the effluent pipework.

There is a demonstrated need for a floating decanter apparatus that can deliver supernatant without initial contamination of solids and can discharge water free of suspended solids through an automated operation, independent of the distance of the decanter from the top of the sludge blanket.

SUMMARY OF THE INVENTION

The floating decanter apparatus of the present invention decants supernatant from a vessel or basin without drawing floating solids or scum in the discharge. The present floating decanter includes a weir having a central opening and a solid bottom side, a float for buoyantly supporting the weir adjacent to an outer edge of the weir, a weir lift and drive assembly, preferably disposed generally above the weir having at least two jack screws attached to the float at evenly spaced locations around the float with a weir attachment arm extending from the weir lift to the weir, and a discharge pipe attached to the bottom side of the weir communicating the decanter with a discharge area outside of the vessel or basin.

The present invention is further directed to a method of decanting a supernatant liquid from a vessel or basin containing a stored liquid with a sludge blanket disposed across at least a portion of the surface of the stored liquid. The present method includes the steps of providing the floating decanter described above on the surface of the stored liquid and adjusting the position of the weir relative to the surface of the stored liquid to initiate an exit flow of the supernatant liquid through the discharge pipe.

DETAILED DESCRIPTION OF THE PREFERRED EMBODIMENTS

In the following description and accompanying drawings, like reference numbers, as used in the various figures, refer to like features or elements. Terms such as bottom surface and inner surface, as used herein, refer to the orientation of a given element as shown in the drawings.

The floating decanter of the present invention overcomes the deficiencies of the prior art by utilizing two or more jack screws to raise the weir lip above the liquid surface level during non-decant sequences. The jack screws are mechanically synchronized and driven by a single, centrally located motor to ensure the weir stays level through its length of travel. This design eliminates the need for various sealing arrangements. The present floating decanter design virtually eliminates the chance of discharging untreated wastewater.

Figure 1:
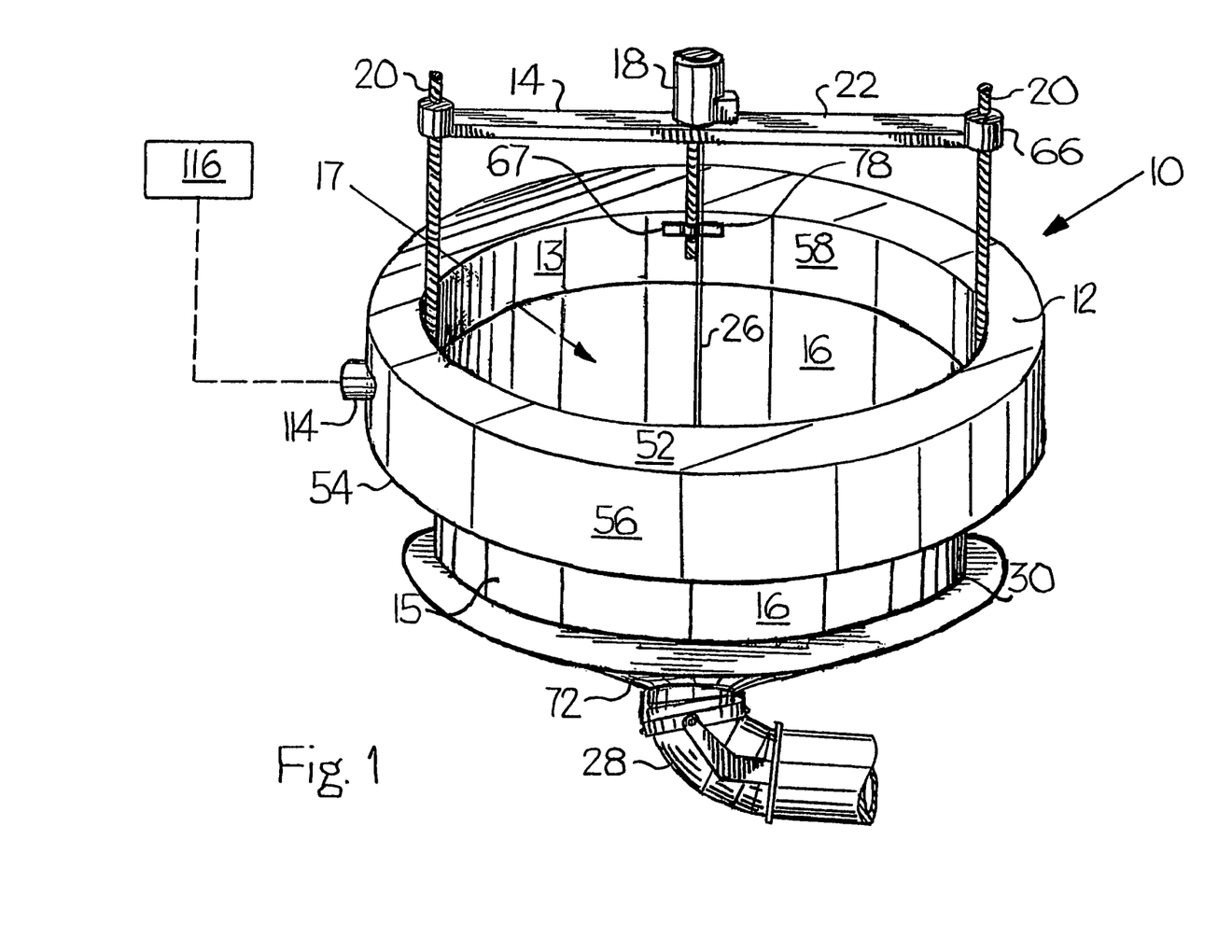
FIG. 1 is a perspective view of a floating decanter of the present invention.
Figure 4:
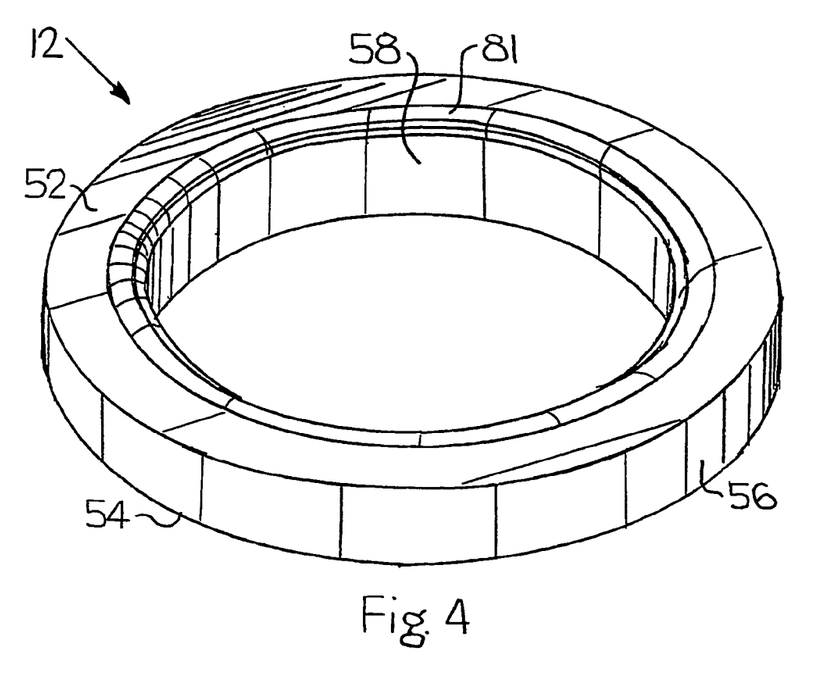
FIG. 4 is a perspective view of a float.
Figure 5:
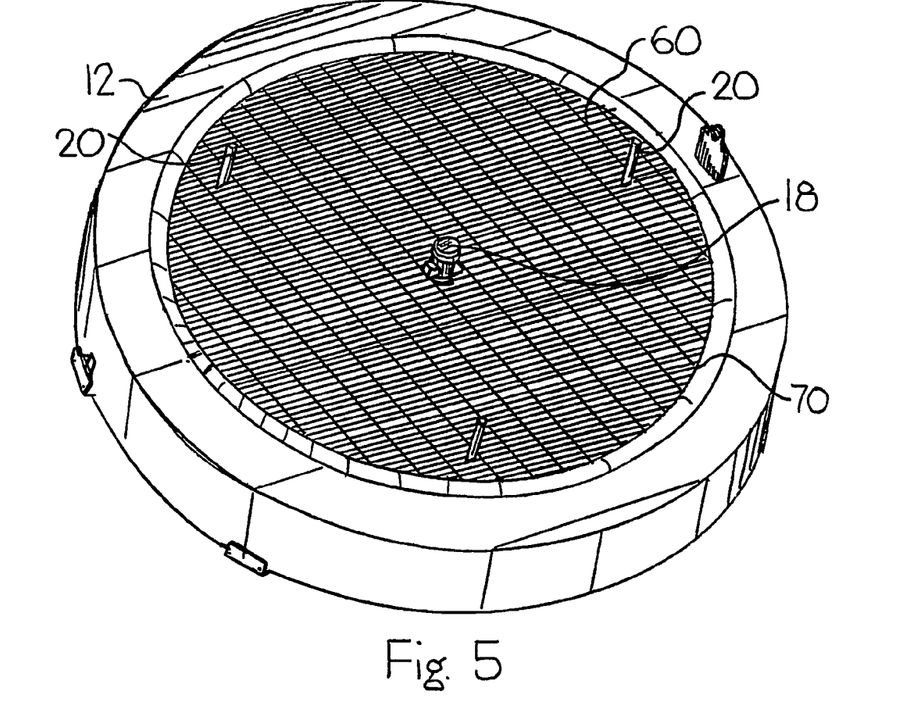
FIG. 5 is a perspective view of a weir and float with grate having three jack screws.
Figure 9:
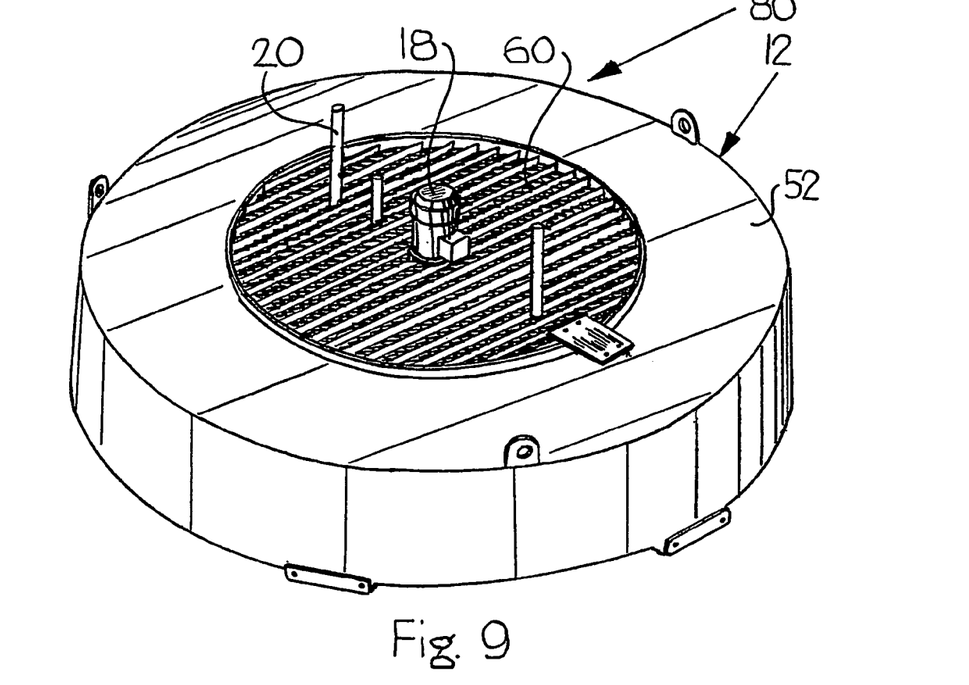
FIG. 9 is a perspective view of a weir and float with grate having two jack screws.

FIG. 1 depicts a floating decanter assembly according to the present invention. FIG. 1 shows a floating decanter assembly 10 having three points of contact to prevent tipping. The floating decanter assembly 10 includes a float 12, a weir lift drive assembly 14, a weir 16, and, optionally, a grate 60 (FIGS. 5 and 9). With reference to FIG. 4, the float 12 has an upper side 52, a lower side 54, an outer edge 56, and inner edge 58.

Figure 6:
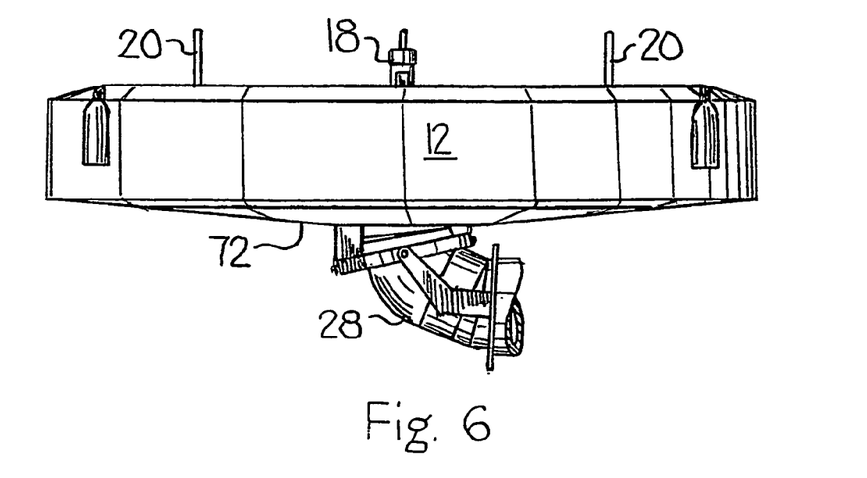
FIG. 6 is a front elevational view of the weir and float of FIG. 5.

Referring to FIGS. 1 and 6, each jack screw 20 is held in place against inner edge 58 of float 12 by an attaching member 67. A weir attachment arm 26 extends from motor 18 to weir 16 and attaches thereto using an attachment coupling (not shown). Weir 16 extends beyond the lower side 54 of float 12 and has a flange-like bottom, which acts as a shield 30. Jack 28 connects weir 16 to discharge pipe 32. FIG. 6 shows the location of jack 28 in greater detail. Weir 16 may optionally be covered by grate 60, as shown in FIG. 5. The location of weir lift drive assembly 14 in relation to float 12 and weir 16 is shown in further detail in FIG. 7.

Figure 7:
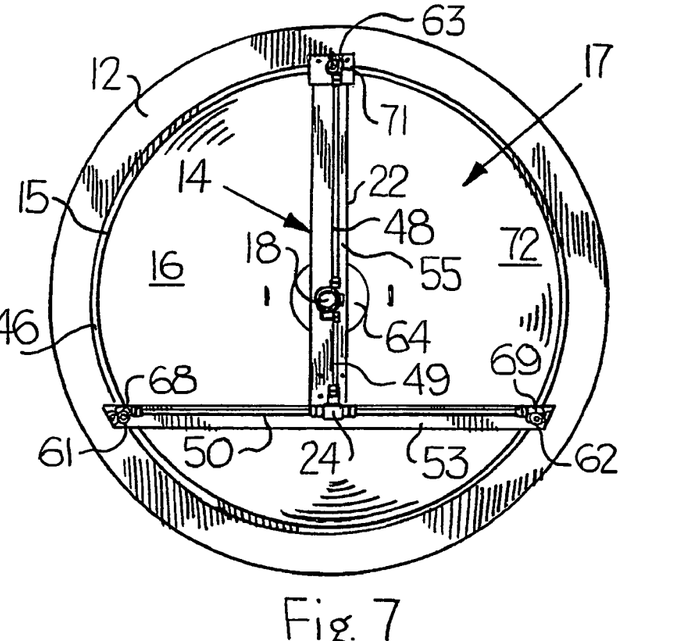
FIG. 7 is a plan view of a floating decanter of the present invention without a grate.

Referring to FIG. 7, a gap or space 46 exists between float 12 and weir 16. The size of space 46 is a distance sufficient to allow clearance between jack screws 20, attaching member 67, weir 16, and/or a threaded jack 78. The size of space 46 can be further described as a distance sufficient to allow unencumbered vertical movement of weir 16 with respect to float 12. Space 46 can be from one half inch to twelve inches, typically from one inch to ten inches, and more typically from two inches to nine inches.

In an embodiment of the present invention, floating decanter assembly 10 includes a weir 16 having a central opening 17 and a solid bottom 72, a float 12 for buoyantly supporting weir 16 adjacent to an outer edge 15 of weir 16, a weir lift and drive assembly 14 in contact with weir 16 and float 12 disposed generally above weir 16, a discharge pipe 32 attached to bottom 72 of weir 16 communicating the floating decanter assembly 10 with a discharge area outside of a vessel or a basin 34.

Figure 3:
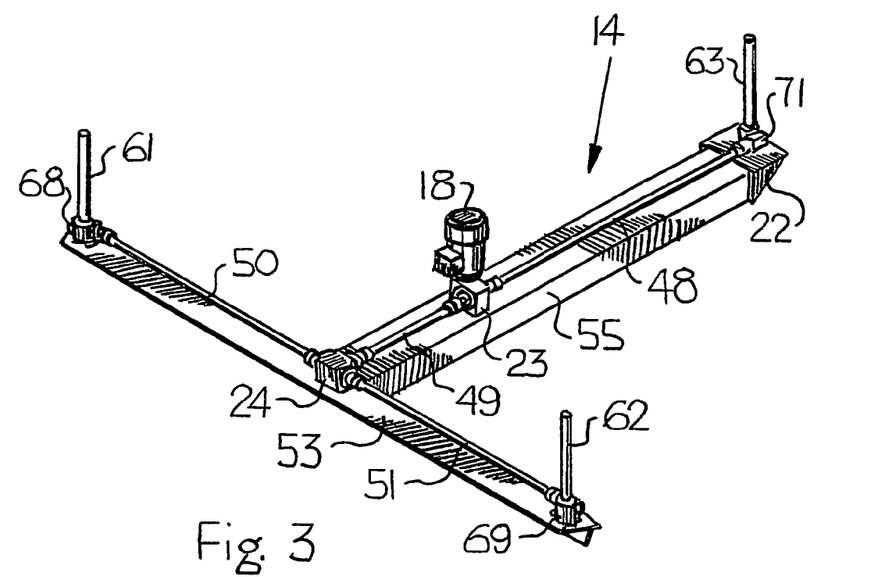
FIG. 3 is a perspective view of a weir lift drive assembly.

In a further embodiment, weir lift and drive assembly 14 of floating decanter assembly 10 includes a support frame 22 disposed generally above weir 16. As shown in FIGS. 3 and 7, support frame 22 includes a cross member 53 extending from a first jack screw 61 to a second jack screw screw jack 62. An extension member 55 extends from a central portion of cross member 53 to a third jack screw 63. First jack screw 61, second jack screw 62, and third jack screw 63 are each attached to float 12 at evenly spaced locations around float 12. A first screw drive jack 68 is attached near an end of cross member 53, a second screw drive jack 69 is attached to an opposite end of cross member 53, and a third screw drive jack 71 is attached near an end of extension member 55. A motor 18 is attached to extension member 55 and located above a central portion of weir 16. A first drive shaft 48 extends from motor 18 to third screw drive jack 71. A second drive shaft 49 extends from motor 18 to a miter gear box 24 with an approximate central location along cross member 53. A third drive shaft 50 extends from miter gear box 24 to first screw drive jack 68, and a fourth drive shaft 51 extends from miter gear box 24 to second screw drive jack 69. Turning to FIG. 1, a weir attachment arm 26 extends from extension arm 53 to the central portion of weir 16. Jack screws 20 (corresponding to jack screws 61, 62, 63 in FIG. 5) have a threaded surface extending along their length, and first screw drive jack 68 is threadably attached to first jack screw 61, second screw drive jack 69 is threadably attached to second jack screw 62, and third screw drive jack 71 is threadably attached to third jack screws 63.

Weir 16 has a generally circular outer edge 15 and a weir diameter, float 12 has a generally circular inner edge 58 with a float diameter. The float diameter is greater than the weir diameter creating space 46 between weir 16 and float 12 such that weir 16 is able to freely move in a vertical direction relative to float 12 (FIG. 7).

Weir 16 is attached to discharge pipe 32 by a coupling 28. Weir 16 has a discharge opening 64 located at a central portion of weir 16. Coupling 28 has a first end attached to discharge opening 64 at the bottom 72 of weir 16 and a second end attached to discharge pipe 32.

In an additional embodiment of the present invention (FIG. 2), the bottom 72 of weir 16 has a bottom diameter, and the bottom diameter is larger than the weir diameter forming shield 30 from the portion of the bottom 72 extending beyond the weir diameter. Shield 30 may extend beyond space 46 and the float diameter.

Figure 2:
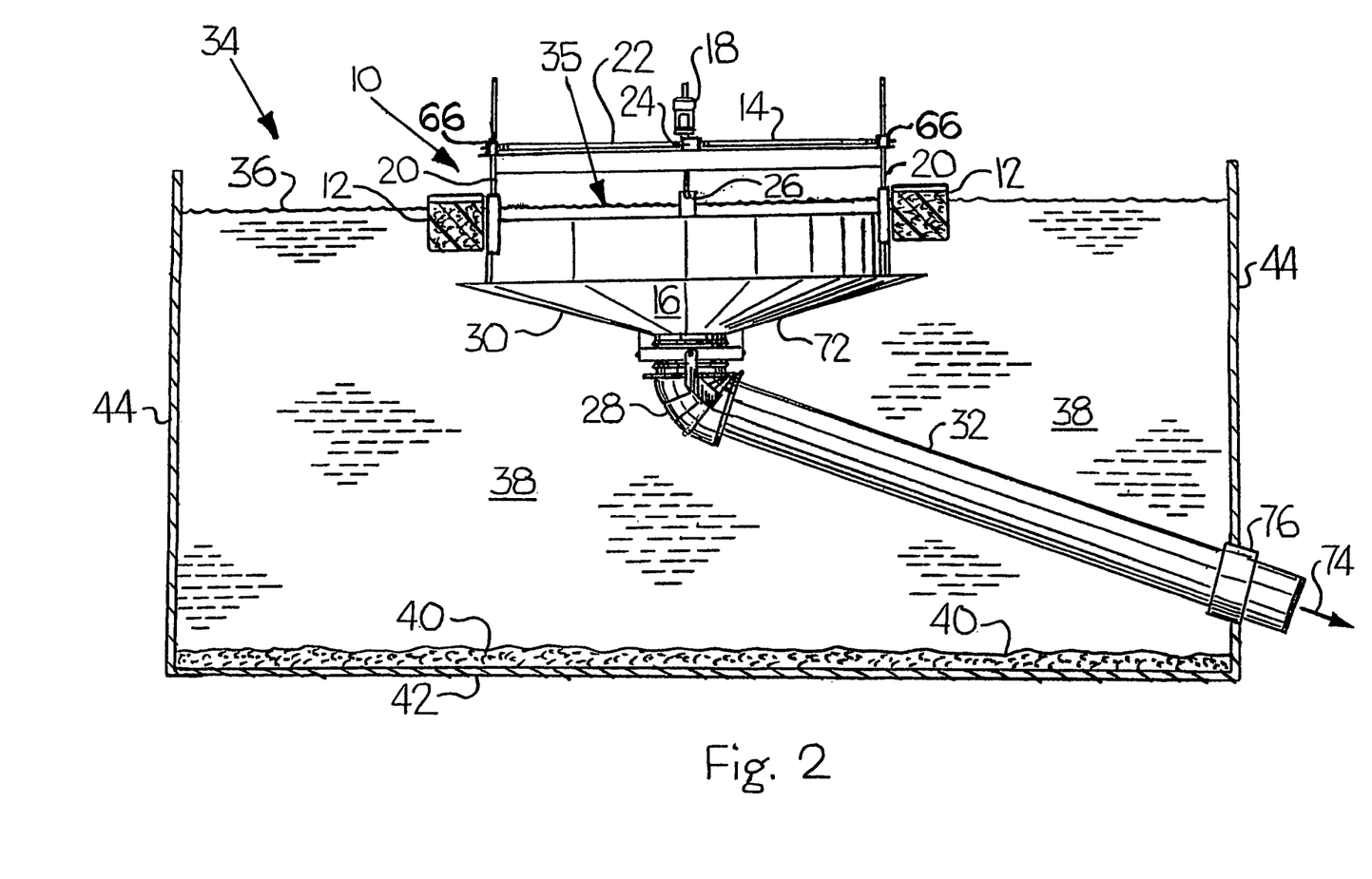
FIG. 2 is a cross-sectional view of the floating decanter, shown in FIG. 1, in a vessel, showing the weir in its discharge position.

Turning to FIG. 2, the operation of the floating decanter assembly for decanting supernatant water 38 from a basin 34 can be described. The floating decanter assembly 10 is disposed in a basin 34 or sequencing batch reactor (SBR) 44, the latter being shown in the settling phase at which the majority of solids 40 have accumulated on bottom 42 of basin 34, leaving the supernatant water 38, along with a certain amount of floating debris 36 (solids and scum) on or near the surface 35 of the supernatant water 38. Motor 18 provides for moving weir 16 relative to float 12 by turning the drive shafts 48, 49, 50 and 51, which causes the screw drive jacks 66 to turn and move along the threaded surface of jack screws 20. Motor 18 can turn in either direction to cause weir lift drive assembly 14 and weir 16 to move up or down relative to float 12 and water surface 35. A first position of weir 16 can be identified as that at which the discharge opening 70 of weir 16 is above the water surface 35. A second position of weir 16 can be identified as that at which discharge opening 70 is below the water surface 35 (as shown in FIG. 2), thereby enabling supernatant water 38 to enter weir 16 from below the water surface 35.

In an embodiment of the present invention, a baffle may be included in weir 16 such that the baffle would retain a volume of liquid, typically water, after completion of the decant cycle when weir 16 is lifted above the water surface 35. The retained water reduces the amount of down force required to submerge the weir. In this way, the total weight of floating decanter assembly 10 can be minimized.

Floating decanter assembly 10 may in some cases, be made heavier in order to create sufficient adequate down force to submerge weir 16. In this case, float 12 must be larger in size in order to provide sufficient buoyancy to lift the water-filled weir 16. Weir 16 may also be partially filled with plastic foam, placed within a false floor of weir 16, for example. The increased buoyancy of weir 16 would then allow float 12 to be smaller.

In the present invention, any floating debris 36 is prevented from entering the discharge opening 70 by the donut-shaped float 12. Weir 16 is located within the central opening of donut-shaped float 12 (as shown in FIGS. 5 and 9). Further, float 12 is sufficiently buoyant that upper side 52 extends above water surface 35. Thus, it can be seen that float 12 operates as a barrier to floating debris 36 (solids or scum) when weir 16 is in the first position during the fill, react, and settling phases, and at its second position during the decant phase. Outer edge 56 of donut-shaped float 12 prevents entry of circulated surface debris 36 directed toward weir 16 during decanting of supernatant water 38.

Float 12 can be made of fiberglass or metal (for example, stainless steel) material and filled with a polyurethane foam which provides buoyancy. It should be appreciated that the discharge opening 70 is expected to be in a position approximately one-half inch to twenty-four inches below the water surface 35 during decanting of supernatant water 38 from vessel 44.

Referring to FIGS. 5 and 9, floating decanter assembly 10 may include grate 60. Grate 60 rests on upper side 52 of float 12 and covers the open area within float 12. Depending on design, grate 60 may allow for motor 18 and a portion of jack screws 20 to protrude above grate 60.

Figure 8:
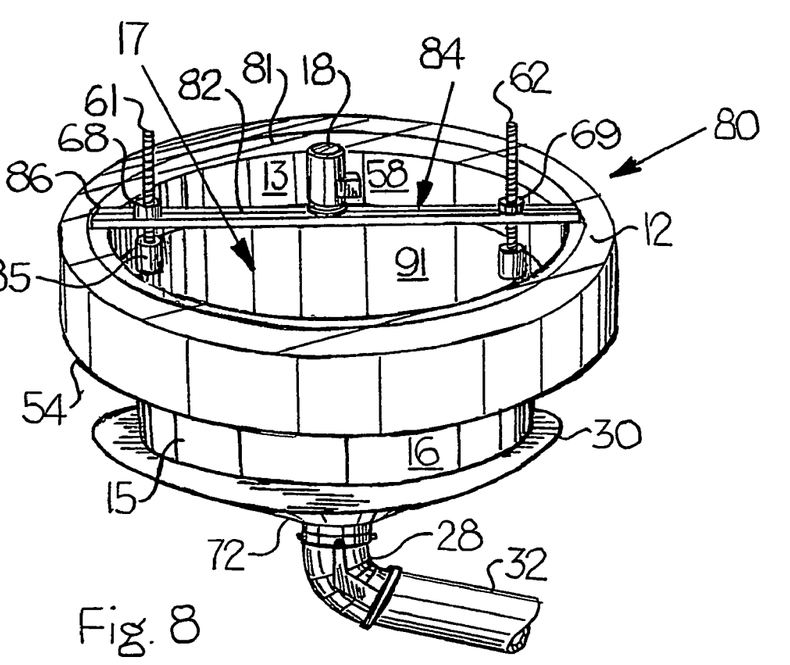
FIG. 8 is a perspective view of a floating decanter having two jack screws.

Floating decanter assembly 10 can be any suitable size to perform its function. The floating decanter assembly can be from two to thirty feet in diameter. Typically, when the floating decanter is less than five to seven feet in diameter, it will have a configuration as shown in FIG. 8, using two jack screws 61, 62. When the floating decanter is larger than five to seven feet in diameter, it will typically have three or more jack screws 61, 62, 63 to provide more points of contact with float 12, which prevents tipping.

Because discharge opening 70 is raised above the water surface 35 during the fill, react, and settling phases, no particulate solids suspended therein have any contact with discharge opening 70. Further, after the solids have settled, leaving the supernatant water 38 with floating debris 36 on the water surface 35, weir 16 is lowered by the weir lift drive assembly 14 to the second position. The donut-shaped float 12 still provides a barrier for any floating debris 36, which may be circulated toward the float during decanting or removing of supernatant water 38.

Bottom 72 of weir 16 is interconnected by means of a flexible coupling 28 which provides a means for removing the supernatant entering weir 16 to a location 74 outside the basin 34.

As noted above, there is space 46 between the weir 16 and the donut-shaped float 12. In prior art floating decanters, when air is injected into the water 38 during the aeration cycle, the water 38 may rise and enter the annulus between weir 16 and donut-shaped float 12, resulting in fouling of the effluent. This results in a very unattractive appearance for the decanter. The present floating decanter includes a shield (bubble baffle) 30 that prevents scum carried by the rising air from entering the annulus between weir 16 and donut-shaped float 12. This prevents contamination of the effluent and keeps the inside of floating decanter assembly 10 clean.

Figure 10:
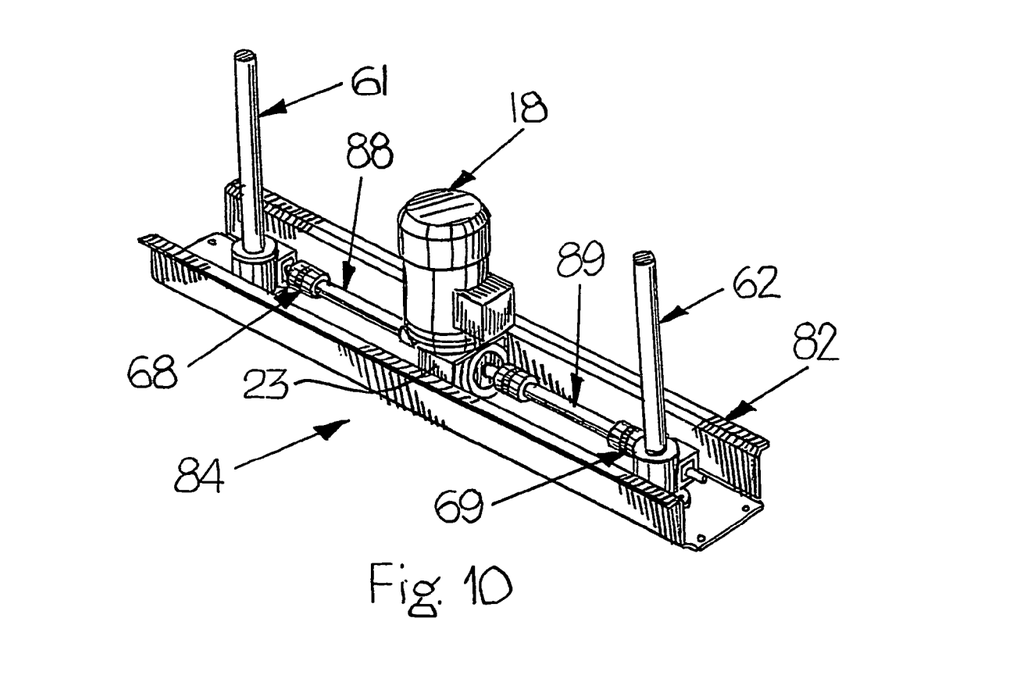
FIG. 10 is a perspective view of a weir lift drive assembly having two jack screws.

With regard to weir lift drive assembly 14, it may be in any configuration as long as it provides support points for the screw jacks 20, gear box 23, and motor 18 (FIGS. 3a and 10). Weir lift drive assembly 14 can be any shape that provides sufficient support and allows for the function of moving weir 16 to be performed. Preferred shapes include straight, T-shaped, triangular, square, hexagonal, or round.

FIG. 3 shows weir lift drive assembly 14. Motor 18 is typically located above the center of weir 16 and drives through a gear box 23 that has double-output shafts. The double-output shafts are first and second drive shafts 48, 49. As was discussed above, the rotating motion of drive shafts 48, 49, 50, 51 is communicated to jack screws 61, 62, 63 through screw drive jacks 68, 69, 71, respectively. The rotating motion of screw drive jacks 68, 69, 71 make weir 16 move up and down relative to float 12. Weir lift drive assembly 14 should have its weight center at the middle of the assembly to prevent tipping floating decanter assembly 10. Screw-drive jacks 68, 69, 71 must all turn at the same speed and at the same time to make weir 16 travel vertically without tipping.

Weir lift drive assembly 14 can be made from any suitable material and is preferably constructed of materials that are non-corroding. As a practical measure, the floating decanter assembly is low in height so it can be installed below the grating deck of an SBR and not constitute a tripping hazard.

Weir lift drive assembly 14 is attached to float 12. Any suitable method of attachment can be used. Preferably, the method of attachment is built integral with the floatation ring or made detachable as shown in FIG. 1. Weir lift drive assembly 14 can be attached to any of upper side 52, lower side 54, inner edge 56, or outer edge 58 of float 12.

Another embodiment of the present invention is shown in FIGS. 8 and 10. The small-floating decanter 80 has a weir lift drive-assembly 84. Weir lift drive assembly 84 includes a support frame 82, which is attached to float 12 at a lip 81 by one or more attachment bolts 86. First jack screw 61 and second jack screw 62 are attached to support frame 82 by way of screw drive jacks 68, 69, respectively. Motor 18 causes first rotating shaft 88 and second rotating shaft 89 to rotate via gear box 23. Each of rotating shafts 88, 89 terminate at screw drive jacks 68, 69, respectively. Jack screws 61, 62 are attached to weir 16 by way of jack screw sockets 85. The rotating action of the rotating shafts 88, 89 causes the screw drive jacks 68, 69 to turn causing jack screws 61, 62 to move weir 16 relative to float 12. Alternatively, the jack screws 61, 62 may be threadedly attached to jack screw sockets 85. In this embodiment, the rotating action of the rotating shafts 88, 89 causes the screw drive jack 66 to turn jack screws 61, 62, where at least part of the outer surface is threaded. The threaded surface of jack screws 61, 62 causes them to move through the threaded inner surface of jack screw sockets 85. The result is weir 16 moving up or down relative to float 12 and water surface 35. In all other aspects, small floating decanter 80 operates as described above for floating decanter assembly 10.

Weir lift drive assembly 14 can have any number of drive shafts that terminate at screw drive jacks. The only caveat is that there is a jack screw to interface with each screw drive jack.

When discharge pipe 32 is a rigid pipe, coupling 28 and outlet coupling 76 will both be a flexible coupling so that the decanter can move to different water levels without tipping or bending discharge pipe 32. Optionally, discharge pipe 32 can be a hose, in which case coupling 28 and outlet coupling 76 are not required, and the hose can be connected directly to weir 16.

Figure 11:
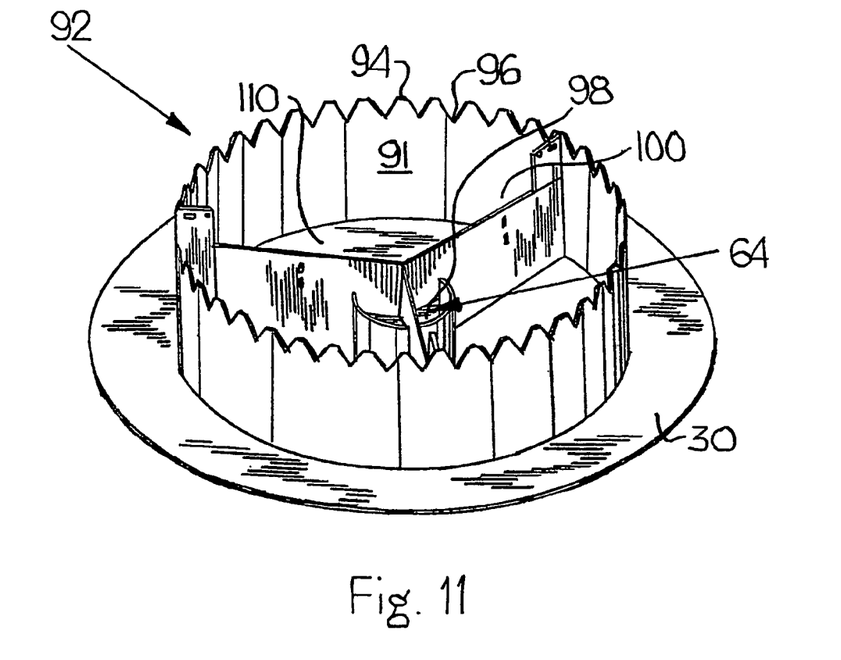
FIG. 11 is a top perspective view of a weir with V-notches.

In a further embodiment of the present invention, the floating decanter assembly may utilize a V-notched weir 92 as shown in FIG. 11. This embodiment includes V-shaped notches 96 for decanting supernatant liquid and a floatation device 12 for buoyantly supporting the weir within basin 34. Since the V-notched weir 92 is lifted out of the water and underwater seals are not required, the present floating decanter assembly can make use of V-notched weir 92 to significantly enhance positive flow characteristics, thereby minimizing disturbance of the settled mixed liquor. Additionally, the design eliminates the need for expensive, actuated effluent decant valves. During the decant sequence, jack screws 20 lower weir 16 to a preset position from a fraction of an inch to several inches below water surface 35 to produce the desired decant rate.

Figure 12:
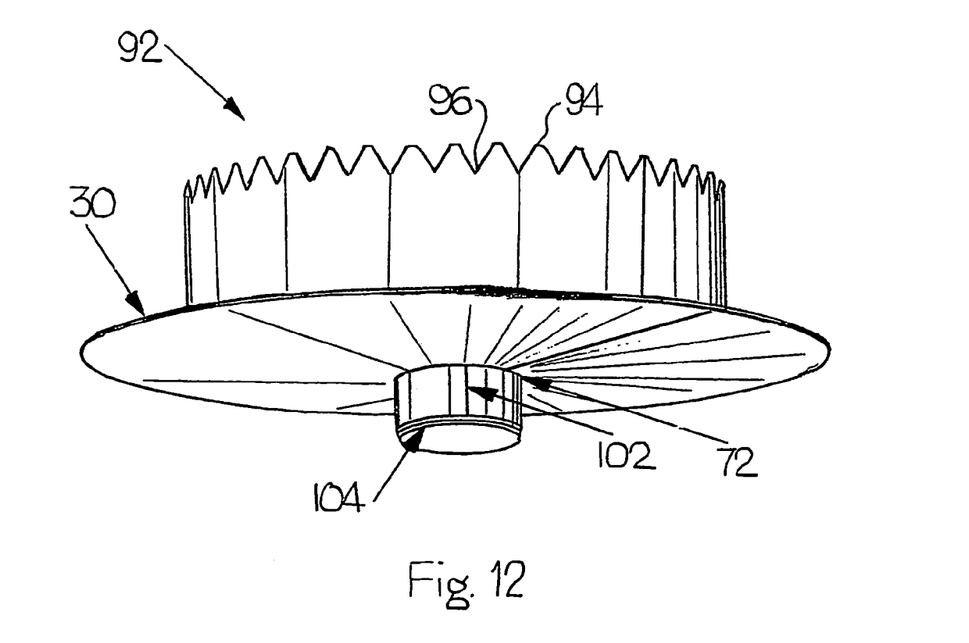
FIG. 12 is a bottom perspective view of a weir with V-notches.

V-notched weir 92 has a top edge 94 along which V-shaped notches 96 are cut. V-notched weir 92 may also have a pipe extension 98, which ultimately connects to discharge pipe 32. V-notched weir 92 may further include weir baffles 100, which extend from an inner surface 91 of weir 16 to pipe extension 98 and into discharge opening 64, along an inner bottom surface 110. FIG. 12 shows V-notched weir 92 with a coupling 102 attached to bottom 72 of V-notched weir 92, which has a weld bead 104 along the outside of coupling 102. Weld bead 104 is used to improve the retention or holding power of a discharge hose or pipe 32 when attached to coupling 102.

When a floating decanter utilizes a weir with a smooth unbroken top edge, that edge is withdrawn above the water level to stop effluent flow. When the weir is depressed into the water during the decant cycle, the uptake of water is sudden and uncontrolled when the descending weir breaks the water surface. When a V-notched weir is used, and the weir descends into the water, the increase in flow rate is gradual and controlled. By adjusting the height of the notched weir in the water the flow, rate can be easily regulated.

Figure 13:
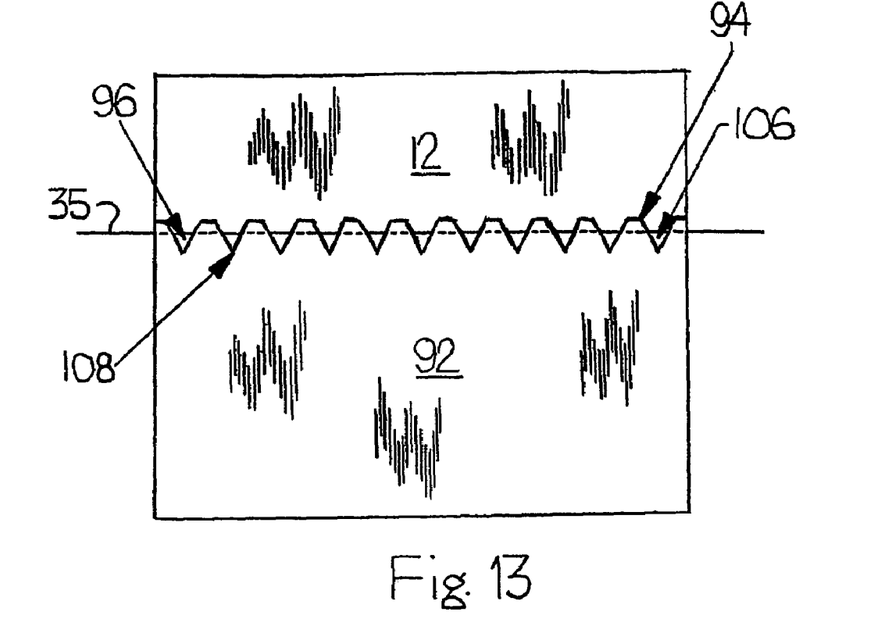
FIG. 13 is a schematic, cross-section view of a weir with V-notches and float according to the present invention.

FIG. 13 is a schematic which shows a floating decanter with V-notched weir in operation. As V-notched weir 92 descends relative to float 12 and water surface 35, water flows through a space 106 defined by an apex 108 of V-notch 96. When V-notched weir 92 descends further, space 106 will become larger, allowing a larger flow of water into V-notched weir 92. As V-notched weir 92 is raised, space 106 becomes smaller, and a lower flow of water will occur.

Figure 14:
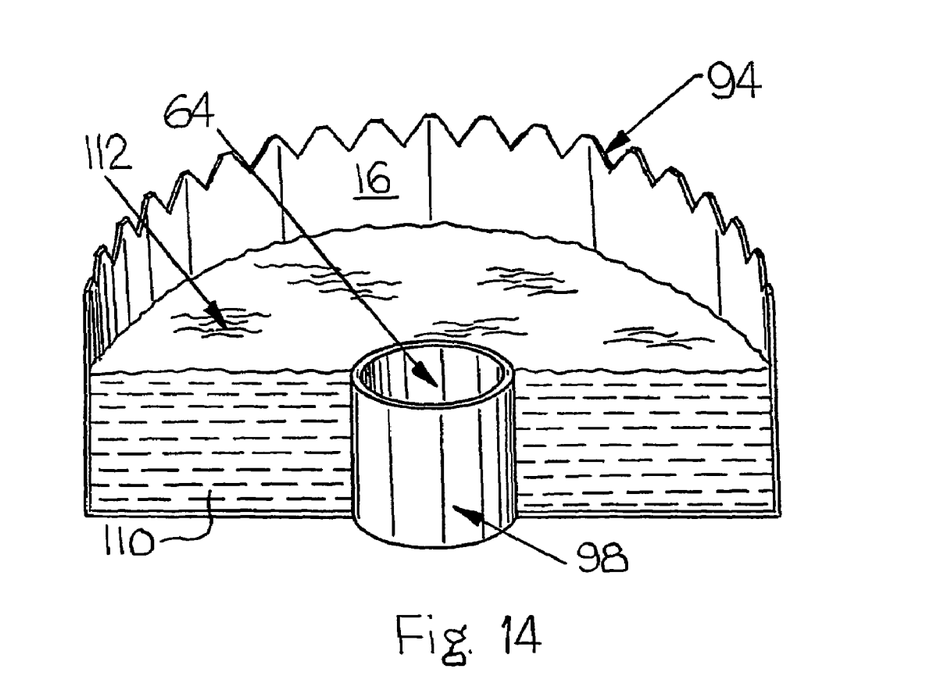
FIG. 14 is a schematic, cross-section view of a weir with pipe extension.

In a further embodiment of the present invention, FIG. 14 is a schematic, cross-section which shows a pipe extension 98 located at the center of inner bottom surface 110. Pipe extension 98 extends upward into weir 16 to create a water retaining baffle 100. This further enhances the performance and ease of operation of the present floating decanter by reducing the amount of water that must be displaced when the weir is pushed down into the water to begin the decant cycle. When the weir is drawn up above the water level to stop the effluent flow, the weir retains water 112 to the top of the pipe extension 98. Without extension 98, the action of pushing the empty weir into the water caused the float to lift partly out of the water. When a smooth-rimmed weir is dropped below the surface and suddenly filled with water, the float drops back into the water causing unwanted disturbances in the water. Decanting disturbances to the water are undesirable because they may result in contaminants being drawn into the clean effluent.

Optionally, sensors, 114 may be attached to floating decanter assembly 10. The sensors 114 can include those that determine depth, temperature, turbidity, weir position relative to the floatation ring, or distance from the floating decanter assembly 10 to sludge blanket layer 40. The floating decanter assembly sensors work cooperatively with sensors in other SBR systems to provide complete process control of the SBR. Signals from the sensors would provide inputs to a programmable controller 116 to operate the SBR process automatically and provide safety interlocks.

The present floating decanter assembly with multiple jack screw systems is used to ensure that the weir is maintained in essentially a perfect horizontal configuration. In addition to its advantages in terms of better effluent quality and in eliminating the complexities of needing actuated decant valves, the present floating decanter will have improved durability over decanters using only a single linear actuator. The floatation device is designed to ensure optimum balance and stability. Furthermore, the float is also designed to act as a baffle to prevent scum from being withdrawn during the decanting operation.

The present invention has been described with reference to specific details of particular embodiments thereof. Obvious modifications and alterations will occur to others upon reading and understanding the preceding detailed description. It is intended that the invention be construed as including all such modifications and alterations. It is not intended that such details be regarded as limitations upon the scope of the invention except insofar as and to the extent that they are included in the accompanying claims.

We claim:

1. A floating decanter for decanting a supernatant liquid from a vessel or basin comprising: (I) a weir having a central opening, and a solid bottom side; (II) a float for buoyantly supporting the weir adjacent to an outer edge of the weir; (III) a weir lift drive assembly; and (IV) a discharge pipe attached to the bottom side of the weir communicating the decanter with a discharge area outside of the vessel or basin, wherein the weir lift drive assembly of (III) comprises: (A) a support frame disposed generally above the weir and attached to a top surface of the float; (B) a first screw drive jack attached near a first end of the support frame; (C) a second screw drive jack attached near a second end of the support frame; (D) a motor attached to the support frame and located above a central portion of the weir; (E) a first drive shaft extending from the motor to the first screw drive jack; (F) a second drive shaft extending from the motor to the second screw drive jack; (G) a first jack screw having a threaded surface extending along its length attached to the weir and extending through the first screw drive jack; and (H) a second jack screw having a threaded surface extending along its length attached to the weir and extending through the second screw drive jack.

2. The floating decanter of claim 1, wherein the supernatant liquid is discharged by flowing through the discharge pipe and the discharged liquid is substantially free of solids or floating scum.

3. The floating decanter of claim 1, wherein the central opening has a diameter of not more than 2.15 meters.

4. The floating decanter of claim 1, wherein the weir is attached to the discharge pipe by a coupling, the weir having a discharge opening located at a central portion of the weir, and the coupling having a first end attached to the discharge opening at the bottom side of the weir and a second end attached to the discharge pipe.

5. The floating decanter of claim 1, wherein at least a portion of the central opening of the weir is covered by a grate.

6. The floating decanter of claim 1 further comprising one or more sensors.

7. The floating decanter of claim 6, wherein the sensors are selected from depth sensors, temperature sensors, turbidity sensors, and weir position sensors.

8. The floating decanter of claim 6, wherein the sensors are in communication with a controller which operates the floating decanter.

9. The floating decanter of claim 1, wherein the weir has a circumferential upper edge comprising V-shaped notches along the circumferential edge.

10. A method of decanting a supernatant liquid from a vessel or basin containing a stored liquid with floating debris disposed across at least a portion of the surface of the stored liquid comprising: (I) providing a floating decanter having a weir and a float on the surface of the stored liquid; (II) connecting the floating decanter to a discharge for conveying supernatant liquid out of the vessel or basin; (III) screening floating debris from the discharge by means of the float; and (IV) lowering the weir with respect to the float, so that supernatant liquid flows over a weir edge into the discharge, and wherein the position of the weir relative to the surface of the stored liquid is adjusted by a motor turning two or more drive shafts, which turn respective screw drive jacks causing the jack screws to move vertically through the jacks, which in turn causes the weir to move vertically with respect to the float.

11. The method of claim 10, wherein the supernatant liquid is substantially free of solids or floating scum.

12. The method of claim 10, wherein the weir is lowered by the motor.

13. The method of claim 12, wherein the weir has a central opening with a diameter of not more than 2.15 meters.

14. The method of claim 10, further comprising sensing one or more operational conditions on the floating decanter and remotely controlling the floating decanter in response to the sensed operational condition.

15. The method of claim 14, wherein the condition sensed is selected from depth, temperature, turbidity, and weir position.

16. The method of claim 10, wherein the stored liquid is waste water.

17. The method of claim 10, wherein the weir has a circumferential edge comprising V-shaped notches evenly spaced along the circumferential edge to convey the supernatant liquid to the discharge in a more controlled manner.

18. A floating decanter for decanting a supernatant liquid from a vessel or basin comprising: (I) a weir having a central opening, and a solid bottom side; (II) a float for buoyantly supporting the weir adjacent to an outer edge of the weir; (III) a weir lift drive assembly; and (IV) a discharge pipe attached to the bottom side of the weir communicating the decanter with a discharge area outside of the vessel or basin, wherein the weir lift drive assembly of (III) comprises:
    (A) a support frame disposed generally above the weir, the support frame comprised of:
        (1) a cross member extending from a first jack screw to a second jack screw; and
        (2) one or more extension members extending from the cross member to one or more other jack screws, wherein the jack screws are each attached to the float at locations around the float;
    (B) a first screw drive jack attached to a first end of the cross member;
    (C) a second screw drive jack attached to a second end of the cross member;
    (D) a third or more screw drive jacks attached to first ends of the one or more extension members;
    (E) a motor attached to the frame and located above a central portion of the weir, the motor adapted to drive the jack screws using drive shafts and the jacks; and
    (F) a weir attachment arm extending from the screw drive jacks extension members to the weir, wherein the jack screws have a threaded surface extending along their lengths and the screw drive jacks are threadably attached to respective frame members.

19. The floating decanter of claim 18, wherein the central opening has a diameter of at least 1.5 meters.

20. The floating decanter of claim 18, wherein the weir has a circumferential upper edge comprising V-shaped notches along the circumferential edge.

21. A floating decanter for decanting a supernatant liquid from a vessel or basin comprising: (I) a weir having a central opening, and a solid bottom side; (II) a float for buoyantly supporting the weir adjacent to an outer edge of the weir; (III) a weir lift drive assembly; and (IV) a discharge pipe attached to the bottom side of the weir communicating the decanter with a discharge area outside of the vessel or basin, wherein the weir has a generally circular outer edge having a weir diameter, the float has a generally circular inner edge having a float inner diameter, and the float inner diameter is greater than the weir diameter creating a space between the weir and the float such that the weir is able to freely move in a vertical direction relative to the float, and wherein the bottom side of the weir has a bottom flange and the bottom flange has an outer diameter larger than the weir diameter, thereby forming a shield extending at least from the weir outer edge to the float inner edge.

22. The floating decanter of claim 21, wherein the shield extends beyond the space and the float inner diameter.

23. The floating decanter of claim 21, wherein the weir has a circumferential upper edge comprising V-shaped notches along the circumferential edge.

24. A floating decanter for decanting a supernatant liquid from a vessel or basin comprising: (I) a weir having a central opening, and a solid bottom side; (II) a float for buoyantly supporting the weir adjacent to an outer edge of the weir; (III) a weir lift drive assembly; and (IV) a discharge pipe attached to the bottom side of the weir communicating the decanter with a discharge area outside of the vessel or basin, wherein the weir comprises a retaining baffle for holding a volume of liquid inside the weir.

25. The floating decanter of claim 24, wherein the baffle comprises an extension pipe extending from the solid bottom side to a height less than the height of a side wall of the weir.

26. The floating decanter of claim 25, wherein the baffle further comprises two or more weir baffles extending from the extension pipe to an inner surface of the weir.

27. The floating decanter of claim 24, wherein the weir has a circumferential upper edge comprising V-shaped notches along the circumferential edge.

28. A method of decanting a supernatant liquid from a vessel or basin containing a stored liquid with floating debris disposed across at least a portion of the surface of the stored liquid comprising: (I) providing a floating decanter having a weir and a float on the surface of the stored liquid; (II) connecting the floating decanter to a discharge for conveying supernatant liquid out of the vessel or basin; (III) screening floating debris from the discharge by means of the float; and (IV) lowering the weir with respect to the float, so that supernatant liquid flows over a weir edge into the discharge, the method including retaining a volume of liquid in a bottom of the weir.

29. The method of claim 28, wherein the weir has a circumferential edge comprising V-shaped notches along the circumferential edge to convey the supernatant liquid to the discharge in a more controlled manner.

* * * * *